United States Patent
Schallenberg et al.

(10) Patent No.: US 12,182,006 B2
(45) Date of Patent: Dec. 31, 2024

(54) METHOD AND COMPUTING ENVIRONMENT FOR CREATING AND APPLYING A TEST ALGORITHM FOR COMPUTATIONAL PROCESSES

(71) Applicant: Siemens Mobility GmbH, Munich (DE)

(72) Inventors: Andreas Schallenberg, Peine (DE); Matthias Bolz, Braunschweig (DE); Uwe Eckelmann-Wendt, Wolfenbüttel (DE); Stefan Gerken, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 112 days.

(21) Appl. No.: 17/987,088

(22) Filed: Nov. 15, 2022

(65) Prior Publication Data
US 2023/0153231 A1 May 18, 2023

(30) Foreign Application Priority Data
Nov. 15, 2021 (EP) .................................... 21208235

(51) Int. Cl.
*G06F 11/00* (2006.01)
*G06F 11/36* (2006.01)
(52) U.S. Cl.
CPC .............................. *G06F 11/3684* (2013.01)
(58) Field of Classification Search
CPC ................................................ G06F 11/3684
See application file for complete search history.

(56) References Cited

U.S. PATENT DOCUMENTS

| | | | |
|---|---|---|---|
| 7,877,642 B2 * | 1/2011 | Ding | G06F 16/23 717/133 |
| 9,256,636 B2 * | 2/2016 | Rash | G06F 40/30 |
| 2017/0244729 A1 | 8/2017 | Fahrny et al. | |
| 2018/0089059 A1 * | 3/2018 | Lee | G06F 11/3612 |
| 2018/0211067 A1 | 7/2018 | Costa | |
| 2020/0110905 A1 | 4/2020 | O'Cleirigh | |
| 2022/0358031 A1 * | 11/2022 | Yanamala | G06F 11/3688 |

FOREIGN PATENT DOCUMENTS

WO      2014009243 A2    1/2014

* cited by examiner

*Primary Examiner* — Marc Duncan
(74) *Attorney, Agent, or Firm* — Laurence A. Greenberg; Werner H. Stemer; Ralph E Locher (57) ABSTRACT

A method performs a computer-assisted creation of a test algorithm for processing applications in a computing environment for executing a large number of application programs, by taking into account configuration data for the application programs. For each application program, a data segment is formed and the configuration data referring to the relevant application program is combined as a data segment. The data segments are combined in a data set. A global ID code is assigned to the data set. Participating components of the computing environment are identified, and an ID code assigned to them. A hash function is applied to each of the data segments contained in the data set. A calculation function is applied to each data segment in that the ID codes, the hash value of the relevant data segment and the global ID code are linked together by computational operators.

18 Claims, 4 Drawing Sheets

METHOD AND COMPUTING ENVIRONMENT FOR CREATING AND APPLYING A TEST ALGORITHM FOR COMPUTATIONAL PROCESSES

CROSS-REFERENCE TO RELATED APPLICATION

This application claims the priority, under 35 U.S.C. § 119, of European Patent Application EP 21208235.8, filed Nov. 15, 2021; the prior application is herewith incorporated by reference in its entirety.

FIELD AND BACKGROUND OF THE INVENTION

The invention relates to a method for creating a computer-assisted test algorithm for processing applications in a computing environment, having at least one host computer for executing a large number of application programs installed on the at least one host computer, by taking into account configuration data for the application programs. In addition, the invention relates to a method for computer-assisted processing of applications in a computing environment, having at least one host computer, by executing a large number of application programs installed on the at least one host computer, by taking into account configuration data for the application programs. The invention relates, moreover, to a safety-relevant computing environment, having one or more host computer(s). Finally, the invention relates to a computer program product and to a provisioning apparatus for this computer program product, the computer program product being equipped with program commands for carrying out this method.

In principle, safety-relevant systems, which run in a computer-assisted manner in a safety-relevant computing environment, guarantee that the correct software, configured with the correct configuration data, is used. Neither different software nor different configuration data nor hardware components (host computers) different from those provided may be used. Within the scope of this invention, safety-relevant is taken to mean the relevance to the operating safety of the system (also called safety). For example, railway applications count as safety-relevant systems in said meaning of the term.

To safeguard safety-relevant computing environments it is known that reliably only the components, which are used for processing the relevant application, are installed on a computer. This means, inter alia, that, following an update, older versions of software have to be completely deleted from the computing environment. This can be achieved, for example, in that the available storage space does not permit parallel storage of two versions of software for reasons of storage capacity. For this purpose, the hardware has to be adapted, at least in respect of the storage capacity, exactly to the software, which is running in the computing environment.

According to international patent disclosure WO2014/009243A2, a method and a computer are described, which has a test algorithm for processing applications in the computing environment formed by the computer. Installed on the computer are application programs, which are configured to be redundant, so that the test algorithm has a chance of exposing errors by comparing the calculation results (generally also called voting). This test only covers the results of the calculations, however. For example, hardware errors can only be exposed when they have an effect on the calculation results to the extent that different calculation results are produced. If the hardware problems result in parallel in identical errors in the carried out calculations in parallel, however, such an error remains undetected.

SUMMARY OF THE INVENTION

The object of the invention consists in disclosing a method for computer-assisted creation of a test algorithm for processing applications in a computing environment and to a method for processing applications in a computing environment, with which error-free processing of the application may be checked as comprehensively as possible with reasonable computing effort. Further, it is an object of the invention to disclose a safety-relevant computing environment, which has one or more host computer(s), in which error-free processing of the application may be checked as comprehensively as possible with reasonable computing effort. In addition, the object of the invention consists in disclosing a computer program product and a provisioning apparatus for this computer program product with which the method can be carried out.

This object is inventively achieved with the claimed subject matter disclosed in the introduction (method) in that for each application program, the data describing the application program is combined as a data segment and the configuration data referring to the relevant application program is combined as a data segment and then the data segments of the large number of application programs and the associated configuration data (that is to say, the configuration data referring to one particular application program in each case as a data segment) is combined in a data set. During creation of the test algorithm the following steps are carried out: the data set (possibly among a plurality of data sets) is identified and a global ID code is assigned to it and components of the computing environment participating in the execution of the application programs of the data set are identified. One host ID code in each case is assigned to each host computer identified as a component or an assigned host ID code is read out and a program ID code is assigned to the application programs identified as the components or an assigned program ID code is read out. A hash function is applied to each of the data segments contained in the data set and one hash value in each case is generated. A calculation function is then created, which is applied to each data segment in that the host ID codes of participating host computers, the program ID codes of participating application programs, the hash value of the relevant data segment and the global ID code are linked together by computational operators, and then as a result of the calculation function a complementary code is calculated and stored. From this, a test function is created, which can be applied to each data segment in that the host ID codes of the participating host computer, the program ID of the participating application programs, the hash value of the relevant data segment and the complementary code calculated for the data segment are linked together by computational operators, wherein the global ID code can be calculated as a result.

The assigned ID codes have to be unique in order to a ensure reliable identification of the marked components, that is to say, hardware components (host computers, storage facilities) or software components (program complexes, programs, subprograms, configuration data). This can take place, for example, by way of one-time allocation in each case of numeric codes whose allocation is monitored to the extent that a numeric code that has been allocated once cannot be allocated again. Program routines, which achieve this, are sufficiently known. Another possibility consists in allocating random numbers of sufficient size (more on this below).

Where ID codes are mentioned in connection with this invention, this signifies the global ID codes, host ID codes, program ID codes, subprogram ID codes and program complex ID codes. The term ID code is universally used for statements which apply to all of these codes.

Advantageously, the inventive method provides the possibility of carrying it out distributed among a plurality of computers. Thus, not just one host computer, but also a plurality of host computers can be used to process a task defined by the data set. The one host computer or the plurality of participating host computers is/are part of the computing environment. The method for creating the test algorithm forms the precondition for this so the test algorithm can be used when processing the task defined by the data set. This is guaranteed by a similarly inventive method for computer-assisted processing of applications in a computing environment (more on this below). Advantageously, commercial computers can also be used here, what are known as COTS components (COTS stands for Commercial off the Shelf).

Programs, which assume a particular task (application) should be referred to as application programs. In principle, two categories of application program may be differentiated. There are application programs, which are intended for managing a task which is to be externally managed (that is to say, outside of the computing environment) with the computing environment. This can be, for example, control components of a railway application. Such application programs are also referred to as useful programs. This refers to the fact that the computing environment should bring benefits for the purpose of processing an external task.

The second category of application programs relates to applications, which are necessary for organizing the function of the computing environment. These can be service programs, which are necessary for the functioning of the computing environment. For example, these can be programs, which enable communication between individual host computers.

Configuration data should be taken to mean data which configures application programs for the individual demands of the application at hand. The configuration includes the interplay of various application programs among themselves and the function of the application programs on the hardware components on which they are installed. In addition, the configuration includes adjustments to the specific application at hand for which the relevant application program is intended (for example parameters, which can differ in different specific applications).

A data set within the meaning of the application should be taken to mean a collection of data whose extent is clearly defined. In particular, the data set may be clearly read from a data carrier by way of addressing or be written onto it. The data set consists of a plurality of data segments, which jointly produce the data set. The data segments are also addressed in such a way that they may be clearly read out from a data carrier or be written onto it. Programs and configuration data may be inventively described by a (this means at least one) data segment and stored on a data carrier.

The start of a data segment and the end of the data segment are thus clearly defined by the addressing. Since a data set consists of a plurality of data segments, the start and the end of the data set is also clearly defined. This means that the data set and also individual data segments may be read from a data carrier and always have the same content. This provides the possibility of identifying errors in the data set, which can occur unintentionally (for example flipped bits). For example, a hash function, which, assuming that no errors have occurred, must always produce the same hash value, may be applied to the data segments. From this it is possible to conclude that there is an error in the data segment if the hash value changes.

By applying a hash function, the integrity of stored data may thus be established, in other words, which in principle should not be changed, because this means that the hash value ascertained by means of the hash function is not allowed to change either.

In addition, errors can occur if, for example, an incorrect application program or the incorrect version of a particular application program or incorrect configuration data of application programs is used. The same also applies to subprograms of the application program or to program complexes, which represent a combination of different application programs. Subprograms and program complexes can also be linked to configuration data, which is likewise not allowed to change.

Irrespective of the fact that the data segments have to be monitored, monitoring of the use of correct hardware components and correct software components is also thus necessary. This occurs inventively in that, predefined by the associated data set, a defined number of hardware components and software components, to which one ID code in each case has been assigned, participates in the processing of an application. The ID codes can then be checked by means of the data set during the processing of tasks. If the ID codes do not match, an error can be output.

Inventively, error-free processing of the task (application) should be checked by way of a test algorithm, which has a test function available for this purpose (more on applying the test algorithm below). To create the test function the inventive method for creating the computer-assisted test algorithm inventively uses a calculation function. In this calculation function the ID codes of all participating hardware components and software components for each of the data segments used in the data set and a hash value pertaining to the respective data segment are linked together by computational operators. A link is made by a further computational operator to the global ID code, which is assigned to the data set formed by the data segments to be tested. By executing the calculation function ascertained in this way a result may thus be calculated, which in connection with this invention is referred to as a complementary code.

The complementary code is used to establish the test function. In the case of the test function too, the ID codes of all participating hardware components and software components, in contrast to the calculation function not the global ID code, however, but the complementary code of the relevant data segment, are linked together by the above-mentioned computational operators. This means that by applying the test function on the condition that no errors exist in the processing of the application, the global ID code has to result, and, more precisely, for all tested data segments of a data set. It is ensured by the complementary code generated by means of the calculation function in each case that, as a result, it is always possible to ascertain the global ID code of the associated data set for all test functions.

The test function thus inventively provides a reliable possibility for checking, with comparatively little computing effort, the error-free configuration of a computing environment (correct and unadulterated software for the correct hardware provided for this purpose) for processing an application. Both hardware components as well as software components, whose data is not changed during processing of the application, are incorporated in the test. Since this data can change randomly, however, this is ensured by applying the hash function, which exposes undesirable data changes. The use of the correct hardware components and software components is ensured by ID codes, moreover, which guarantee a unique identification of the hardware components and software components used.

Only data which is to be changed by applying the computing environment (calculation results, digitized measured values, inputs, variable requirements of the application that are to be taken into account) may not be tested with the inventive test function. This data can be safeguarded, however, in a manner known per se by providing redundancy. For example, it is possible to calculate this data in a plurality of, preferably three, parallel process sequences and to then compare the results in the framework of voting. The results are only rated as being reliable if at least the majority of the compared results matches. Parallel processing of an application by the computing environment can be carried out in the computing environment in particular by three data sets processed in parallel. This can advantageously ensure that the processing of a data set can be carried out without feedback in each case in respect of the other processing operations. The probability of the occurrence of errors in the processing of a data set also having an effect on the processing of other data sets can thereby advantageously be reduced as far as possible.

Of course the possibility of mutual influencing cannot be completely ruled out because, for example, a hardware error in a host computer, which is participating in the processing of a plurality of data sets, can also in parallel have an effect on a plurality of processing procedures. The potential for improvement therefore relates solely to the adoption of errors from the processing procedure of one data set to another. However, the probability of hardware errors having an effect on the processing of a plurality of data sets, can advantageously be reduced further if each data set is processed on a different host computer.

In connection with the invention, "computer-assisted" or "computer-implemented" can be taken to mean an implementation of the method in which at least one computer or processor executes at least one method step of the method.

In connection with the invention, a "computing environment" can be taken to mean an infrastructure consisting of computers, programs and stored data, which are used for processing an application, which has a task to fulfil.

The expression "host computer" or "computer" (in connection with this invention, computer is used synonymously for host computer) covers all electronic devices with data processing properties. Computers can be, for example, personal computers, servers, handheld computers, mobile phones and other communication devices, which process data in a computer-assisted manner, processors and other electronic devices for data processing, which can preferably also be joined together to form a network forming the computing environment.

In connection with the invention, a "processor" can be taken to mean, for example, a converter a sensor for generating measuring signals or an electronic circuit. A processor can be, in particular, a central processing unit (CPU), a microprocessor, a microcontroller, or a digital signal processor, possibly in combination with a storage unit for storing program commands, etc. A processor can also be taken to mean a virtualized processor or a soft CPU.

In connection with the invention, a "storage unit" can be taken to mean, for example, a computer-readable memory in the form of a random-access memory (RAM) or data storage (hard drive or data carrier).

"Interfaces" can be implemented in terms of hardware, for example wired or wirelessly, and/or in terms of software, for example as an interaction between individual program modules or program parts of one or more computer program(s).

A "Cloud" should be taken to mean an environment for "Cloud computing". What is meant is an IT infrastructure, which is made available via interfaces of a network such as the Internet. As a rule, it includes storage space, computing power or software as a service without these having to be installed on the local computer using the Cloud. The services offered in the framework of Cloud computing comprise the entire spectrum of information technology and includes, inter alia, infrastructure, platforms and software.

"Program modules" should be taken to mean individual functional units, which enable an inventive program sequence of method steps. These functional units can be implemented in a single computer program or in a plurality of computer programs that communicate with each other. The interfaces achieved in this connection can be implemented in terms of software within a single processor or in terms of hardware if a plurality of processors is used.

Unless disclosed otherwise in the description that follows the terms "create", "establish", "calculate", "generate", "configure", "modify" and the like preferably refer to processes, which generate and/or modify data and/or transfer the data into other data. The data exists, in particular, as physical variables, for example as electrical pulses or also as measured values. The necessary instructions program commands are combined in a computer program as software. Furthermore, the terms "send", "receive", "read in", "read out", "transfer" and the like refer to the interaction of individual hardware components and/or software components via interfaces.

According to one embodiment of the invention, it is provided that at least one application program has a large number of subprograms, wherein for each subprogram, the data describing the subprogram is combined as a data segment and the configuration data referring to the relevant subprogram is combined as a data segment, a subprogram ID code is assigned to a subprogram identified as a component or an assigned subprogram ID code is read out, during the creation of the calculation function and the test function, the subprogram ID codes of participating subprograms is additionally linked by a computational operator.

Within the meaning of the invention, subprograms should thereby be taken to mean relatively small units, such as program modules, the entirety of which produces the application program. It is thus advantageously possible to construct application programs modularly, that is to say, to provide program modules, for example, which are used in a plurality of application programs. Depending on their use, the subprograms can be configured with different configuration data. Subprograms thus make it possible to be able to create application programs more easily and thereby be able to adapt the computing environment more easily to a specific application.

According to one embodiment of the invention, it is provided that a plurality of application programs are combined to form a program complex, wherein for each program complex, the data describing the program complex is combined as a data segment and the configuration data referring to the relevant program complex is combined as a data segment, a complex ID code is assigned to a program complex identified as a component or an assigned complex ID code is read out, during the creation of the calculation function and the test function, the complex ID codes of participating program complexes is additionally linked by a computational operator.

Program complexes thus combine a number of application programs whose joint processing with a view to the entirety of applications can be combined. In particular it can be provided that all application programs contained in the data set are combined to form a program complex. This takes account of the fact that the data set brings about a combining of data segments in respect of the data being used, while, in parallel, a program complex combines the corresponding application programs to which the data segment are assigned.

The application programs can also form program modules, while in this case the program complex consists of a compilation of these program modules. In other words, program modules can be used on a plurality of levels.

In connection with the creation of program complexes, application programs and subprograms it should be noted that configuration data can be in each case assigned to the program complexes, the application programs and the subprograms in each case. This can result in particular data with the same content being stored multiple times, with this producing data segments in each case, which can in turn be uniquely assigned to a program complex, application programs or subprograms. The possibility of a unique assignment in order to have uniquely addressable data segments available to create the test function is important in this connection. Since the data segments themselves consist of data that is unchanging per se, the fact that subprograms, application programs and program complexes access different addresses as required in order to retrieve data with the same content is harmless for the course of processing of the application. Provided the application of all test functions produces the expected global ID code, it can be assumed that there is no error in the configuration of the applications (that is to say, owing to corrupt stored data, incorrect loading, incorrect assignments to the hardware, etc.).

According to one embodiment of the invention, it is provided that UUIDs are used as host ID codes and/or program ID codes and/or subprogram ID codes and/or system ID codes.

A Universally Unique Identifier (UUID) is a 128-bit number, which is used for identifying information in computer systems. The expression Globally Unique Identifier (GUID) is also used and should be included in the term UUID within the scope of the invention. In the case of generation according to the standard methods, for practical purposes UUIDs can advantageously be assumed as being globally unique. Although the probability of an UUID being duplicated is not zero, it is so low that the probability of a collision is negligible. UUIDs may thus also be used for safety-relevant applications, for example in railway technology in which different SILs (Safety Integrity Level) that are to be adhered to are defined.

A further advantage of UUIDs is the independence from a central registration authority or coordination between the parties, such as the host computer or the host computers, the systems, programs and subprograms (in contrast to most of the other numbering methods). This is achieved by (pseudo-)randomly generated UUIDs. Here all bits, which are not set to fixed values by the UUID format, are occupied by (pseudo-)random values. Although the uniqueness is not guaranteed for a UUID generated in this way, the total number of randomly generatable UUIDs is so large that the probability of the generation of two identical UUIDs is negligible if the random number algorithms used supply uniformly distributed random numbers. UUIDs can therefore be arbitrarily generated without a central controlling body and be used for identification without running the relevant risk of the same UUID being used for something else.

According to one embodiment of the invention, it is provided that an MD5 algorithm is used as the hash function.

The Message Digest algorithm 5 (MD5 algorithm) is a common cryptographic hash function, which generates a 128-bit hash value from any message (formed by a data segment within the scope of the invention). This allows, for example, a data retrieval to be easily checked for correctness. It is one representative of a series of cryptographic hash functions, which was developed in 1991 by Ronald L. Rivest at the Massachusetts Institute of Technology, as analyses showed that its predecessor MD4 is probably insecure. In the meantime MD5 is likewise no longer deemed safe (in the sense of security) since it is possible in principle to generate different messages, which have the same MD5 hash value.

However, the probability of two messages randomly receiving the same hash value is very low. The method is therefore advantageously suitable for generating with sufficient probability a different hash value for every message, that is to say, every data segment, so that the method is suitable for safety-relevant applications such as railway operation, in particular if the railway application is additionally protected against access by unauthorized third parties. This eliminates the generation of identical hash values being improperly carried out.

The high level of security with respect to generation of identical hash values from different messages is a property which is common to all cryptographic hash functions. This is motivated per se by the demand for a high level of security against adversarial attacks connected with encryption. This property is not to the fore for the inventive use, however. The computing environment only needs to be externally protected against adversarial attacks. Inside the computing environment it is solely necessary for the data segments to generate unique hash values, and this is guaranteed, for example, by the MD5 algorithm.

According to one embodiment of the invention, it is provided that the ID codes assigned to the components and the generated hash values have the same bit-length, wherein the test function is established for each bit of the ID codes and the hash value, one complementary bit in each case is calculated, the complementary code having the same bit-length is calculated from the entirety of the complementary bits and is stored.

In particular, the complementary code can have a length of 128 bits if the MD5 algorithm is used as the hash function and UUIDs are used as the ID codes. The bit by bit application of the test function (preferably the bit by bit creation of the test function with bit by bit application of the calculation function) has the advantage that a system of simple test equations may be used hereby as the test function with which short computing times may be achieved. The calculation can thus be carried out both quickly and in a resource-saving manner.

According to one embodiment of the invention, it is provided that the ID codes, the hash value and the complementary code are linked together by an XOR operator.

An XOR operator is also referred to as "exclusive or". In terms of information technology this means that a one is generated as an output of an XOR operator if the inputs of the operator are occupied differently by zero and one. The output generates a zero if the inputs of the operator are identically occupied, both by zero or both by one, therefore.

The XOR operator is advantageously particularly suitable for a bit by bit comparison of the hash values and ID codes. The link causes the linked bits to produce a one if they are different and to produce a zero if they are identical. The result ascertained in each case is then compared with the next linked operands. One particular advantage is that after calculation of the complementary code from the calculation equations, the test equations, which jointly produce the test function, may be calculated bit by bit from the calculation function. The test equations are thus suitable for a bit by bit test of the relevant data segments.

Depending on the ID codes considered, the calculation function can be created, for example, to give $$HID \times KID \times PID \times TID \times HASH \times GID = KC$$

wherein the test function becomes, for example, $$HID \times KID \times PID \times TID \times HASH \times KC = GID$$

where
- HID host ID code, for example as the UUID
- KID complex ID code, for example as the UUID
- PID program ID code, for example as the UUID
- TID subprogram ID code, for example as the UUID
- HASH hash value, ascertained for example with the MD5 algorithm
- KC complementary code, for example having the length of 128 bit
- GID global ID code, for example as the UUID
- × computational operator, for example XOR operator
- wherein when a plurality of host ID codes, complex ID codes, program ID codes or program ID codes exist, the ID codes of the relevant type are also multiply linked,
- wherein the basic function results from the calculation function after calculation of the complementary code by exchanging the complementary code for the global ID code, so that the function can be applied in that a check is made as to whether by using the relevant ID codes, the hash value and the complementary code, the global ID code of the relevant data segment results,
- wherein the calculation function and the test function is applied to each bit as the calculation equation and test equation,
- wherein the calculation function and the test function are simplified accordingly if no complex ID codes and/or subprograms ID codes are used.

The object is alternatively also inventively achieved with the claimed subject matter of the invention disclosed in the introduction (method) in that for each application program, the data describing the application program and the configuration data referring to the relevant application program are combined as a data segment in each case. The data segments of the large number of application programs and the configuration data are combined in a data set, wherein a test algorithm created according to the method illustrated above is used to calculate the result of the associated test function for a data segment, to output the result or to compare it with the global ID code and to output the comparison result.

The latter method is thus an application of the test algorithm in which the test function generated in the above method is applied for testing methods for computer-assisted processing of applications. The advantages already described above are achieved hereby, and these shall not be stated once again at this point. It is possible to examine the sequences in the implementation of the method for errors. This takes place by applying the test algorithm, which in the case of error-free use of the data segments and an error-free selection of the hardware components and software components has to generate the global ID code as the result. By implication, an error can be assumed if the global ID code is not the result of the application of the test function.

The result of the test function is output therefore for the purpose of identifying errors. However, there are different approaches for identifying errors in the computer-assisted processing of the applications.

It is possible to compare all generated results of the test functions of data segments of a data set with each other. These always have to produce the same global ID code in the case of data segments of one data set. Since the test function is applied to each data segment, there is a large number of results available, so that even without knowledge of the global ID code an error-free configuration of the computing environment can be indirectly inferred if all results of the various test functions are identical.

If individual results differ but the majority of the test functions produce the same result, the data segments in which there is an error can be identified. Suitable measures can be initiated on this basis (more on this below). In the majority of results it can be assumed that the relevant data segments were error-free and were linked with the correct hardware components and software components. A single differently calculated global ID code is sufficient for this to be regarded as an error for the entire configuration.

Another possibility consists in the respective results of the test function being compared with the previously ascertained global ID code. This has to be retrievable for such a comparison, however. The global ID code is therefore known when generating a comparison result of this kind. To prevent it from also being used, owing to an error, in the processing of the test function in the case of computer-assisted processing of the applications it can be stored in a region of the computing environment protected by hardware or software, it being possible for the comparison with the results generated by the test function to preferably also take place in this protected region.

According to one embodiment of the invention, it is provided that at least one application program has a large number of subprograms, wherein for each subprogram, the data describing the subprogram is combined as a data segment and the configuration data referring to the relevant subprogram are combined as a data segment, a subprogram ID code is assigned to a subprogram identified as a component or an assigned subprogram ID code is read out, during the calculation of the test function the subprogram ID codes of participating subprograms is additionally linked by a computational operator.

According to one embodiment of the invention, it is provided that a plurality of application programs is combined to form a program complex, wherein for each program complex, the data describing the program complex is combined as a data segment and the configuration data referring to the relevant program complex is combined as a data segment, during the calculation of the test function the complex ID code of participating program complexes is additionally linked by a computational operator.

The advantages connected with the definition and use of subprograms and program complexes have already been illustrated above and shall not be repeated at this point.

According to one embodiment of the invention, it is provided that data is transferred from a first of the application programs and/or subprograms and/or program complexes to a second of the application programs and/or subprograms and/or program complexes. The data is transferred together with the result of the associated test function. The data from the second of the application programs and/or subprograms and/or program complexes only being processed or for applications above a predefined safety level, only being processed if the result of the test function of the first of the application programs and/or subprograms and/or program complexes transferred with the data matches the result of the test function of the second of the application programs and/or subprograms and/or program complexes.

Strictly speaking, the test function applies to the data segment describing the relevant application program. Since an application program, whose execution generates variable data, which has to be exchanged with other application programs, is also connected with the data segment, however, there is interest in a test by way of the application programs receiving the data as to whether an error-free generation of the transferred data can be assumed. Since the received application program can apply the test function referring to its data segment, a comparison of the result with the result of the application program (data segment) from which the data was received is possible. In the case of a match, the probability of an error having occurred in one of the application programs being executed (data segments) is low. A check can thus take place in parallel with the transmission or at least soon thereafter.

With a deviation in the results of the above-mentioned test function, as an alternative further processing of the data can be prevented or at least suspended or prevented or at least suspended only for applications, which reach or exceed a predefined safety level. This has the advantage that the computing capacity of the affected application programs continues to be available for non-safety-relevant applications. In other words, what is meant here is that the applications can be carried out if errors that occur (for example a program crash) do not hold any safety-relevant risks (safety-relevant risks in the case of railway applications are, for example, train collisions or other accidents).

According to one embodiment of the invention, it is provided that the first and the second of the application programs and/or subprograms and/or program complexes is stopped or the host computer identified for these application programs and/or subprograms and/or program complexes is shut down if the result of the test function of the first of the application programs and/or subprograms and/or program complexes transferred with the data does not match the result of the test function, the second of the application programs and/or subprograms and/or program complexes.

Stopping the program sequence or shutting down the identified host computer advantageously effectively prevents the incorrect processing of the application being continued further. Following this the relevant application program (incl. subprograms, program complexes) can also be restarted or the affected host computer re-booted. In particular if the application programs are being executed redundantly to be able to carry out subsequent voting of the generated variable data, operation, for example of a railway application, can continue while individual application programs or host computers are restarted. These are again incorporated in the redundant operation as soon as their operation is possible. Using the results then generated, by applying the test function it is possible to immediately check whether the measure has eliminated the error that occurred. If this is not the case, more extensive measures have to be initiated. For example, a service technician can be requested for maintenance measures.

According to one embodiment of the invention, it is provided that before starting a processing procedure, which includes an interaction between a large number of application programs and/or subprograms and/or program complexes, the results of the test functions of this large number of application programs and/or subprograms and/or program complexes are compared with each other and a transmission of data between application programs and/or subprograms and/or program complexes is only permitted or above a predefined safety level, is only permitted if all results of the test function match or a transmission of data only between application programs and/or subprograms and/or program complexes is permitted whose result of the test function matches the majority of the results of the test function.

The processing procedure itself is preferably likewise controlled by an application program responsible for it. This application program thus contains instructions for the interaction of the large number of application program, which participate in the processing procedure. Data is transferred between the participating application programs here, as already described above. The application program responsible for controlling the processing procedure can likewise contain routines, which test the match of the results of the test functions of the affected application programs.

Advantageously, the application programs can therefore already be tested by means of the test function before the application programs generate and exchange variable data (within the meaning of user data, which is necessary for the processing procedure). A processing procedure, which will potentially generate faulty data, can be prevented from the outset hereby. The processing of the service programs, which enable the application of the test function, and the data exchange connected therewith, naturally take place but are not relevant to the actual processing procedure of an application, for example for controlling railway operation. They also run in the background once the processing procedure has started.

According to one embodiment of the invention, it is provided that the at least one application program and/or subprogram and/or the at least one program complex, whose result of the test function deviates from the majority of the results of the test function, or the host computer identified for this at least one application program and/or subprogram and/or at least one program complex is prevented from executing this at least one application program and/or at least one subprogram and/or at least one program complex (PK1 . . . PK4) if not all of the results of the test function match.

According to one embodiment of the invention, it is provided that the ID codes assigned to the components and the generated hash values have the same bit length, wherein the test function is established for each bit of the ID codes and the hash value and the complementary code, one result bit in each case is calculated, the result test function with the same bit length is calculated from the entirety of the result bits and stored.

The object is alternatively also inventively achieved with the claimed subject matter disclosed in the introduction (safety-relevant computing environment) in that the host computer or all host computers are adapted to carry out a method according to one of the preceding claims.

Use of the above-mentioned inventive method in a safety-relevant computing environment, which is provided in particular for a railway application, generates the advantages already illustrated within the scope of the inventive method.

That which was stated in relation to the inventive method also applies accordingly to the inventive computing environment.

A computer program product having program commands for carrying out the inventive method and/or its exemplary embodiments is claimed, moreover, wherein by means of the computer program product, the inventive method and/or its exemplary embodiments in each case can be carried out.

Furthermore, a provisioning apparatus for storing and/or providing the computer program product is claimed. The provisioning apparatus is, for example, a storage unit, which stores and/or provides the computer program product. Alternatively and/or in addition, the provisioning apparatus is, for example, a network service, a computer system, a server system, in particular a distributed, for example cloud-based computer system and/or virtual computer system, which stores and/or provides the computer program product, preferably in the form of a data stream.

Provision takes place in the form of a program data block as a file, in particular as a download file, or as a data stream, in particular as a download data stream, of the computer program product. This provision can also take place, for example, as a partial download, however, which consists of a plurality of parts. A computer program product of this kind is read into a system, for example using the provisioning apparatus, so that the inventive method is executed on a computer.

Further details of the invention will be described below with reference to the drawings. Identical or corresponding elements in the drawings are provided with identical reference characters in each case and will only be illustrated multiple times insofar as differences arise between the individual figures.

The exemplary embodiments illustrated below are preferred embodiments of the invention. In the exemplary embodiments the described components of the embodiments in each case represent individual, features of the invention, which are to be considered independently of each other and which also develop the invention independently of each other in each case and should therewith also be regarded, individually or in a combination other than that shown, as an integral part of the invention. Furthermore, the described components can also be combined with the above-described features of the invention.

Other features which are considered as characteristic for the invention are set forth in the appended claims.

Although the invention is illustrated and described herein as embodied in a method and a computing environment for creating and applying a test algorithm for computational processes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
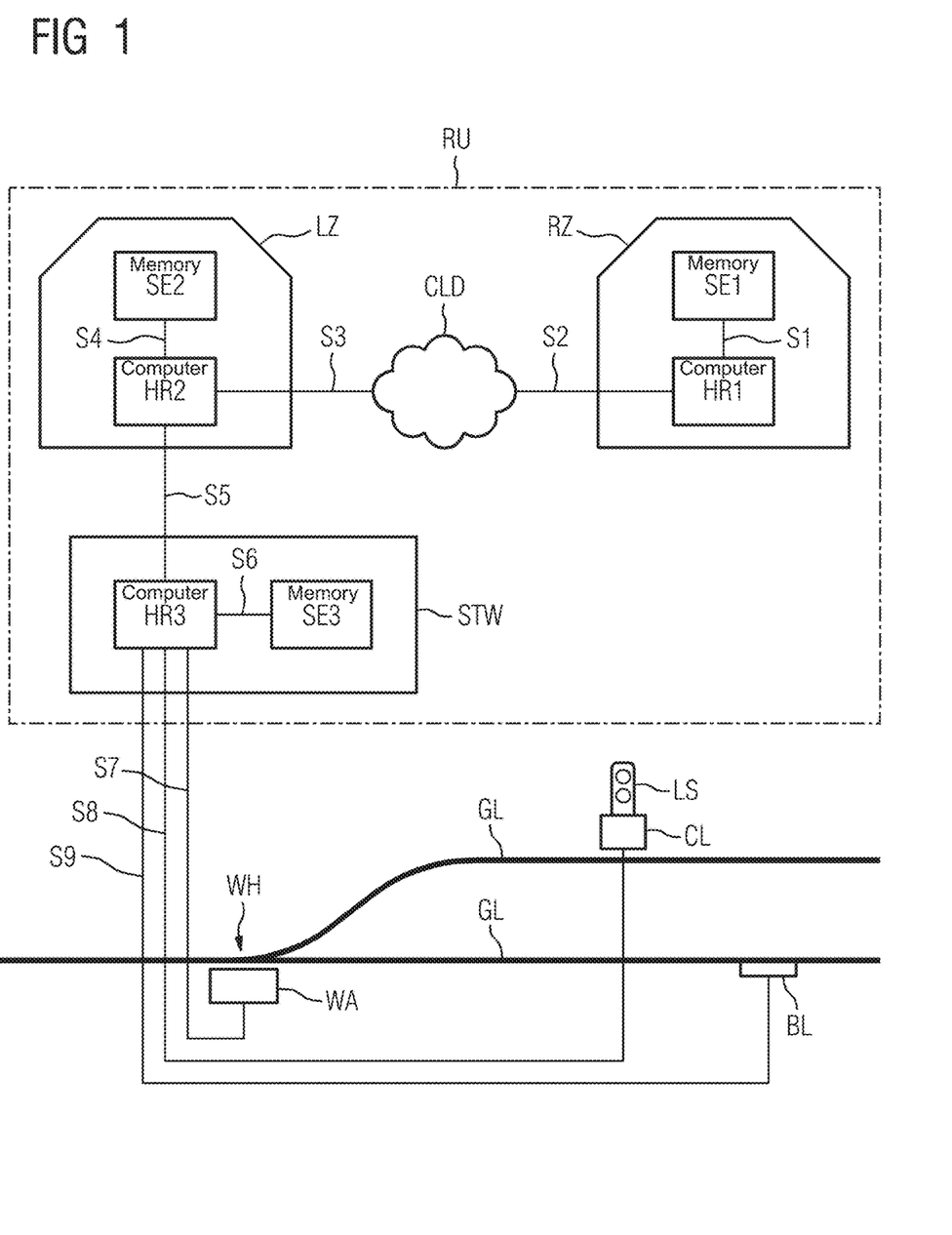
FIG. 1 is an illustration showing a railway application with an exemplary embodiment of the inventive computing environment with its cause-effect relationships according to the invention.

Referring now to the figures of the drawings in detail and first, particularly to FIG. 1 thereof, there is shown schematically a railway application, which is controlled by a computing environment RU. The railway application has rails GL on which different components of signal box engineering are represented by way of example. Here this is a point mechanism WA, which can set points WH. A balise BL is installed in one of the rails, moreover, with the aid of which information can be exchanged with trains crossing the balise. Finally a light signal LS is represented, which is controlled by a controller CL.

The computing environment RU can have different host computers HR1, HR2, HR3 among which applications for controlling the railway application in the form of application programs (more on this below) are distributed. The first host computer HR1 is provided by a computing center RZ and is connected to a first storage facility SE1 via a first interface S1. The computing center RZ can be operated, for example, by a service provider of the railway operator or by the railway operator itself. The first host computer HR1 is connected to a Cloud CLD via a second interface S2, so that it is not locally linked to the railway application.

A control center LZ of the railway operator accommodates the second host computer HR2, which is likewise connected to the Cloud CLD via a third interface S3. In addition, the second host computer HR2 is connected to a second storage facility SE2 via a fourth interface S4.

The computing environment RU also has, by way of example, a signal box STW, which accommodates the third host computer HR3, which is connected to a third storage facility SE3 via a sixth interface S6. In addition, the third host computer HR3 has a fifth interface S5 to the second host computer HR2. The host computer HR3 could also be connected to the Cloud CLD (not shown). The third host computer HR3 also has a seventh interface S7 to the point mechanism WA, an eighth interface S8 to the controller CL and a ninth interface S9 to the balise BL.

All interfaces S1 . . . S9 in FIG. 1 in principle can be implemented in a wired manner or also by a wireless transmission technology, for example radio. The arrangement of the host computers HR1 . . . HR3 is merely exemplary and can be expanded in any way in more complex railway systems. A computing environment is defined in that the participating host computers HR1 . . . HR3 can communicate among themselves and, as a result, the applications, by taking into account available computing capacities, can be processed so as to be distributed among the host computers HR1 . . . HR3.

Figures 2, 2A:
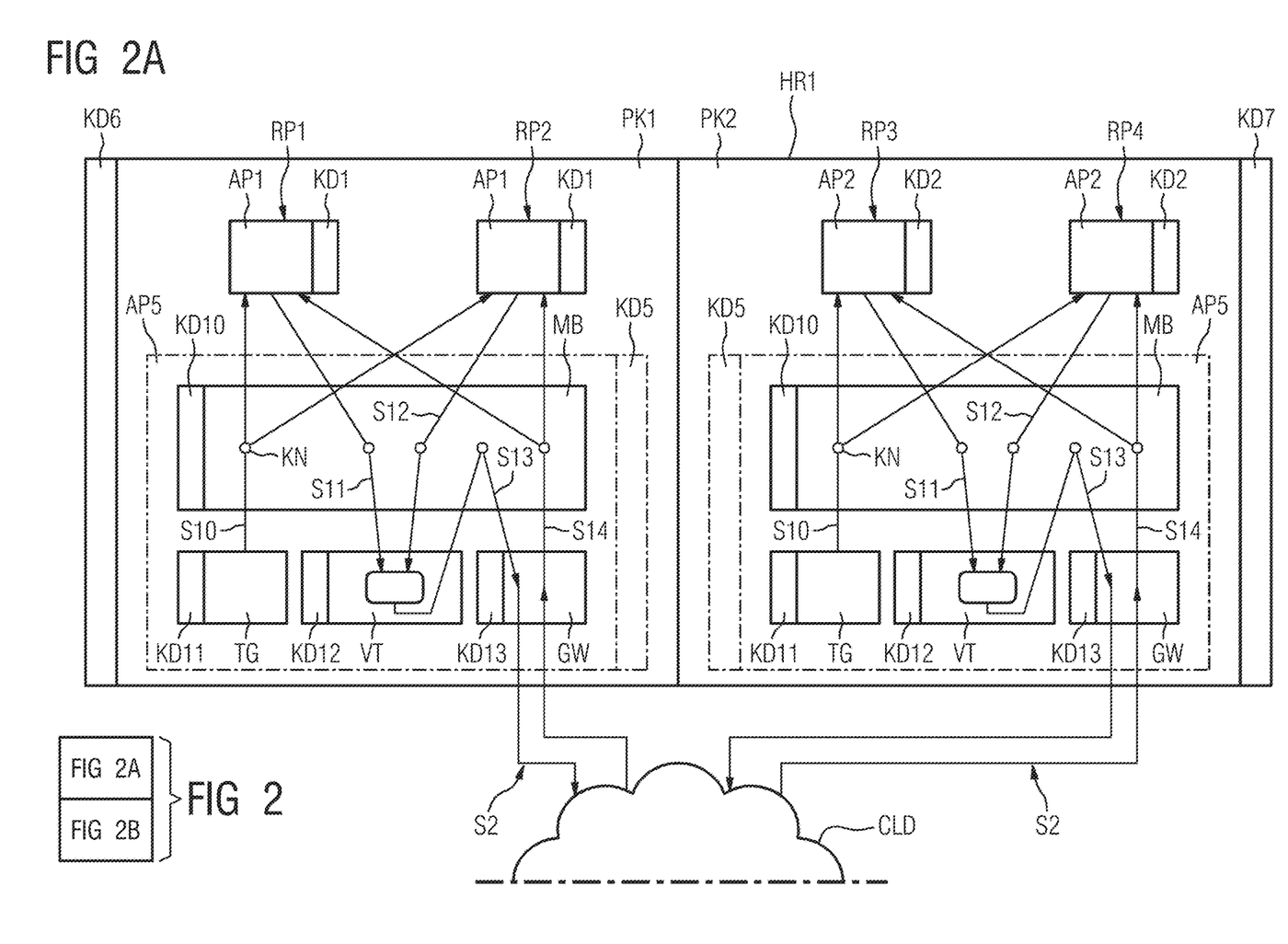
FIGS. 2A and 2B are block diagrams showing an exemplary embodiment of the computing environment in the railway application in FIG. 1 with two host computers, wherein the individual functional units contain program modules, which can run in one or more processor(s) in each case and the interfaces can accordingly be configured in terms of software or hardware.
Figure 2B:
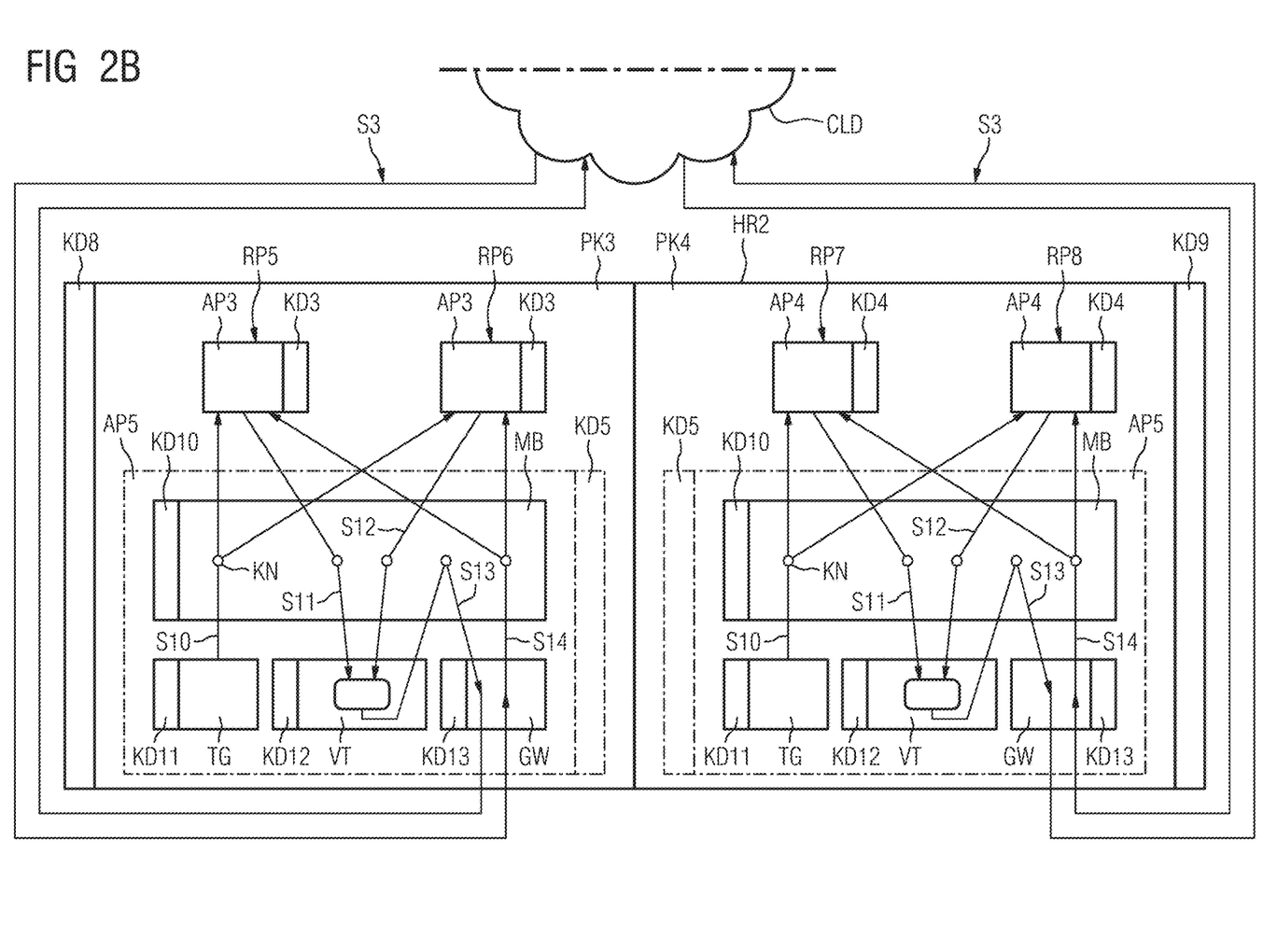

FIGS. 2A, 2B represents the configuration of the first host computer HR1 and the second host computer HR2 in FIG. 1 in an exemplary manner. Further host computers can be integrated analogously. The host computers are organized such that for the purpose of managing, particular task complexes in the form of program complexes PK1, PK2, PK3, PK4 are organized on the host computers, which consist of individual application programs AP1 ... AP5. The fifth application program AP5 also demonstrates that this can be achieved by individual subprograms. The subprograms of the fifth application program AP5 are a gateway GW, a voter VT, a clock generator TG and a message broker MB (more on this below). This should be understood merely as an example, however. Alternatively, the clock generator could run in another (not secure) application, while the rest of the subprograms run, as described, in the one (secure) application.

The fifth application program AP5 is uniformly organized in all program complexes PK1 ... PK4. Messages can be exchanged with the Cloud CLD via the gateway GW. The gateway GW therefore forms the interfaces S2 and S3 in FIG. 1. The messages are distributed within the program complex PK1 ... PK4 via the message broker MB, preferably according to the Publish-Subscribe method. The gateway GW uses, for example, an interface S14 to make received messages available to replicants RP1 ... RP8 via the message broker MB. These are then retrieved by the replicants RP1 ... RP8. This is indicated by nodes KN, which are indicated in the interface S14 (and likewise in the further, interfaces S10 ... S13 yet to be described below).

For the sake of clarity, the program complexes PK1 ... PK4 are in each case fully implemented in one host computer HR1 ... HR2 in FIGS. 2A, 2B. In reality, program complexes with their application programs and subprograms can also run distributed among a plurality of host computers (not shown). This advantageously makes it possible to utilize capacities of host computers if they do not provide sufficient capacity for the configuration of an entire program complex in that the capacity of a plurality of host computers is jointly used for the relevant program complexes.

The program complexes can be provided, for example, for a particular task complex. For example, a program complex for actuating a particular railway component (signal, signal box, points, axle counter, etc.) can be used. Generally a plurality of application programs is necessary for actuating these railway components. In particular, the application programs AP5 already illustrated above are also required to guarantee safe execution of the application and communication with other host computers.

Within the meaning of the invention, a replicant is taken to mean a software implementation on the host computers HR1 ... HR3, which allow parallel processing of application programs AP1 ... AP4, preferably within the program complex PK1 ... PK4. FIGS. 2A, 2B represents program complexes each with two replicants. Preferably, however, three replicants are used, but more replicants are also conceivable. The method for processing the application programs using the first program complex PK1 for the first replicant RP1 and the second replicant RP2 in order to process the first application program AP1 will be illustrated below. Processing proceeds correspondingly for the program complexes PK2 ... PK4, however, so that these do not have to illustrated separately.

The first application program AP1 is processed in parallel in the first replicant RP1 and second replicant RP2. This is an application program, which assumes a task for the railway application in FIG. 1. In the first replicant RP1 and in the second replicant RP2, first configuration data KD1 is available, moreover, which is necessary for executing the first application program AP1 in order to process the individual task of the railway application. For example, the first application program AP1 can generally serve to actuate light signals, with the first configuration data KD1 guaranteeing the application of the first application program AP1 to the light signal LS in FIG. 1. For example, communication with the controller CL in FIG. 1 has to be ensured here.

Configuration data KD1 ... KD13 is also available to all other program complexes PK1 ... PK4, application programs AP1 ... AP4 and subprograms MB, TG, VT, GW. The configuration data KD1 ... KD13 accordingly includes the data necessary for the program complexes, application programs and subprograms in each case, so that they can assume the tasks allocated to them in the relevant specific application. The configuration data is unchanging in each case and can therefore be stored in a data segment with known start and known end. Similarly, all program complexes PK1 ... PK4, application programs AP1 ... AP4 and subprograms TG, VT, GW, MB are stored as data segments with known start and known end. For example, the first storage facility SE1, the second storage facility SE2 and the third storage facility SE3 in FIG. 1 are available for this purpose.

Data, which changes during processing of programs, is exchanged between the participating partners as messages. As already mentioned, the message broker MB is available for this purpose. In addition, the individual host computers HR1, HR2 communicate among themselves via the external interfaces S2, S3, for example by means of a Cloud CLD, so that data can also be exchanged between different program complexes PK1 ... PK4 of different host computers.

The processes in the railway application in FIG. 1 are safety-relevant for the operational safety of the railway application. This is the reason the first application program AP1 is processed in parallel in the first replicant RP1 and the second replicant RP2, that is to say redundantly. The first replicant RP1 and the second replicant RP2 send the result in the processing of the application to the message broker MB, and, more precisely, the first replicant RP1 via the eleventh interface S11 and the second replicant via the interface S12. These results are retrieved via said interfaces from the voter VT, which carries out voting. Only if the majority of the results matches (that is to say, in the case of two replicants, both results, in the case of three replicants, at least two results, in the case of four replicants, at least three results, etc.), is the result made available to the message broker via the thirteenth interface S13 and is it possible for it to be retrieved from the gateway GW via the thirteenth interface S13 for transmission to other units via the second interface S2.

In order for the calculation results to be simultaneously available for the voting by the voter VT, the processes in the first replicant RP1 and in the second replicant RP2 are clocked via the clock generator TG. This provides clock signals via the tenth interface S10, which can likewise be retrieved by the first replicant RP1 and the second replicant RP2 via the message broker MB.

The depicted type of processing of tasks by the first application program AP1 and the second application program AP2 is ensured by the fifth application program AP5. The fifth application program AP5 is therefore an internal application program, which supports the functionality of the host computers HR1 ... HR3. This makes it clear that application programs have to be made available not only for the application of the railway application in FIG. 1 (useful programs), but also for the processing of applications in the host computers HR1 ... HR3 (service programs).

Combining application programs to form program complexes and dividing application programs into subprograms facilitates the compiling of application programs here, as well as checking the processing of the tasks for freedom from error. For this purpose, data is combined to form data segments, which can be uniquely identified and addressed in each case as such (by defining a start of the data segment and an end of the data segment). As already mentioned, subprograms, application programs, program complexes and the configuration data associated in each case are defined as data segments. Here the required data is preferably stored multiple times if necessary, so that the data segments and configuration files can be uniquely assigned to one functional equation (calculation function) in each case. In other words, the situation does not occur in this case where different application programs, when they use identical configuration data, access the same storage location for this data, but instead always access the data segment assigned to them in each case in which the data is available.

Figure 3:
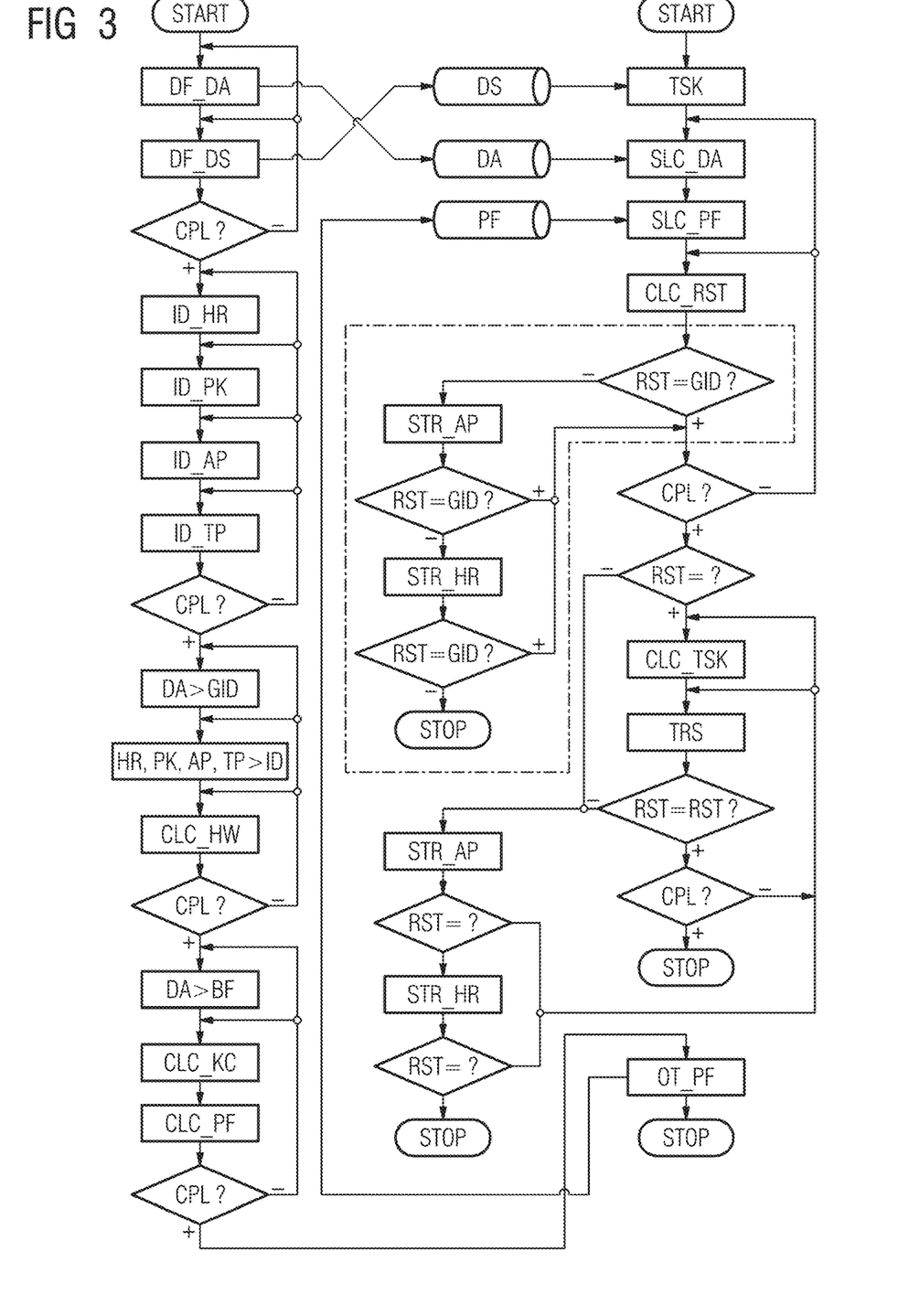
FIG. 3 is a flowchart of an exemplary embodiment of the inventive method, wherein the individual method steps can be implemented individually or in groups by program modules and wherein the functional units and interfaces in FIGS. 2A, 2B are indicated by way of example.

In a highly simplified manner FIG. 3 represents the method for creating a computer-assisted test algorithm and its subsequent use in a method for computer-assisted processing with testing of the data segments used by way of the test function. The simplification consists, in particular, in combining recursive loops, and this is intended to provide clarity.

The method for creating the test function starts in a routine having a determining step for data segments DF_DA and a determining step of data sets DF_DS, which consist of a consistent set of data segments within the meaning that processing the data segments of a data set serves to manage a task TSK. The determining steps for data segments DF_DA and determining steps for data sets DF_DS are repeated until all data segments for the intended tasks TSK have been determined and suitably combined to form data sets and the data segments DA and data sets DS have been stored. A query step CPL? as to whether the steps were carried out completely takes place for this purpose.

The data segments DA and data sets DS are determined in such a way that the data segments can be uniquely identified by way of a known start of the data segment and a known end of the data segment. Compiling different data segments DA to form one data set DS can be uniquely identified accordingly. This means that the data segments and data sets are exactly defined and can thus be addressed and in particular a hash function for generating a hash value may be applied to the data segments (more on this below).

All unchanging data, which is necessary for processing a task TSK, is uniquely acquired by the determination of the data segments DA. This is data describing the subprograms, application programs and program complexes (this is the program code which can be executed by host computers here) and the configuration data, which configures the relevant program for the relevant specific application in the computing environment RU.

The hardware components and software components participating in the processing of tasks are now identified in a further routine. The data sets are organized in such a way that they contain all data segments for managing the planned task TSK and thus form the boundaries for the identification in this routine. In detail, an identifying step for program complexes ID_PK, an identifying step for application programs ID_AP and an identifying step for subprograms ID_TP is carried out. These steps are repeated until all hardware components and software components have been identified. This is checked by a query step CPL? to establish whether all steps were carried out. The hardware components and software components are identified in particular by evaluating the data segments with the configuration data since they also include addresses for the hardware components and software components to be used.

A routine follows in which the process parameters for a process function PF are determined. This consists of assignment steps for a global ID code DA>GID in which preferably a UUID is assigned as a global ID code to the respective data segments DA. Furthermore, all identified hardware components and software components are assigned one ID code in each case, preferably likewise a UUID. Host computers HR are assigned a host ID code, program complexes PK a complex ID code, application programs AP a program ID code and subprograms TP a subprogram ID code. In a calculation step for a hash value CLC_HW, a hash value is also assigned to each data segment DA by applying a hash function, preferably the MD5 algorithm. The steps are repeated until a query step CPL? reveals that the steps were carried out for all data segments, hardware components and software components.

In a subsequent routine, calculation functions BF are now created and calculated for all data. In a creation step for the calculation function DA>BF, the hardware components and software components relevant to the respective data segment, with their corresponding ID codes, are taken into account to the extent that they are linked together by an operator, in particular an XOR operator. In addition, the global ID code of the relevant data segment DA is linked.

In a subsequent calculation step for a complementary code CL_KC, a complementary code is calculated as a result of the calculation function. Preferably, this occurs by way of one equation each for each bit of the ID codes and of the hash value, which in this case all have the same bit length. As soon as the complementary code KC has been calculated it may be used in a calculation step for the test function CLC_PF to create an associated test function (likewise preferably bit by bit for each bit, by way of an equation, see above), in which test function the ID codes already ascertained and the hash value of the relevant data segment are linked to the complementary code, with the result of this test function being the global ID code of the relevant data segment.

A query CLP? checks whether all process functions were created. The process functions are then output by way of an output step OT_PF and stored before the method ends.

The method for computer-assisted processing of applications starts with the selection of a task TSK, with a suitable stored data set DS being used for this task. In detail, the data segments of this data set required for the task are loaded (these can be, but do not have to be, all data segments of this data set, although all loaded data segments pertain to the selected data set), with these being suitably selected in a selection step for data segments SLC_DA. In a further selection step for the process function SLC_PF, the test functions PF calculated for the loaded data segments DA (hash values, ID codes, complementary code, optionally global ID code) are downloaded. For these test functions, the result is calculated in a calculation step CLC_RST by enlisting the parameters, and optionally a query is started as to whether the result RST matches the global ID code GID. If this is the case, the routine for calculating the results of all test functions PF is repeated until a query CLP? reveals that all test functions were calculated.

The optional query step RST=GID presupposes that the global ID code GID is available to the method. This then has to be suitably stored in the computing environment. Limitation of access to the global ID code is advantageous so it cannot be used outside of the optional step described due to an error in the method. Only in this way is it ensured that the method works only with the results RST from the application of the test function PF and the correctness of which without the actually present global ID code is compared with the results RST of other calculations (more on this below).

If the query RST=GID should reveal that the relevant calculated result RST does not match the global ID code, then in a next step, application program AP pertaining to the calculated test function PF is stopped and preferably started again by a restart STR_AP. The query RST=GID is then re-set. If the result is now correct, the next test function is calculated. If the result is incorrect, the host computer is shut down and the host computer HR is restarted in a step STR_HR. A new query RST=GID is made. If the result is now correct, the next process function is calculated. If the result is still incorrect, the method is stopped at least for the affected host computer. As a consequence, more far-reaching maintenance measures, for example by a service technician, are necessary and carried out (not shown).

If the above-mentioned query CPL? reveals that all process functions were calculated, a query step RST=takes place in which it is queried whether all calculated results RST have the same value. If this is the case, processing of the task TSK can be begun in a calculation step CLC_TSK. Individual computing operations are necessary here, which also necessitate, inter alia, transmission steps TRS for data between individual host computers, program complexes, application programs or subprograms. If data is transferred between the components, then this is transferred together with the result RST of the associated test function of the sender component. A check is then carried out for the receiver component as to whether the result RST, which it receives from the sender component, matches the result RST, which is available to the receiver component. This is possible since the components are linked to the associated data segments DA due to the identification that has occurred.

If the results are identical, it is queried in a query step CPL? whether the sub-steps have taken place completely in the processing of the task TSK. If this is the case, the method is at an end and a new task TSK can be started. If this is not the case, a next calculation step CLC_TSK and further necessary transmission steps TRS are executed in a recursion.

If the query RST=has a negative result, a repair routine is started, which proceeds in a manner similar to the options indicated above. In the step STR_AP, the application program AP is stopped and the application program is preferably restarted. The query RST=is then repeated. If the result RST matches in the majority of the results of the used data segments DA, the calculation step CLC_TSK or the transfer step TRS can be repeated. If the result does not match the majority of the results of the other data segments, the host computer HR can be shut down and be re-booted in a step STR_HR. A query step takes place as to whether the result RST now matches the majority of the results of the data segments DA. If this is the case, the calculation step CLC_TSK or transfer step TRS are repeated. If this is not the case, the method is stopped. It is necessary for a maintenance task to be carried out, for example by a service technician (not shown).

The following is a summary list of reference numerals and the corresponding structure used in the above description of the invention:

LZ control center
STW signal box
RZ computing center
GL rail
WH points
WA point mechanism
LS light signal
CL controller for light signal
BL balise
RU computing environment
HR1 ... HR3 host computer
SE1 ... SE3 storage facility
S1 ... S14 interface
CLD Cloud
RP1 ... RP8 replicant
AP1 ... AP5 application program
PK1 ... PK4 program complex
KD1 ... KD13 configuration data
MB message broker
TG clock generator
VT voter
GW gateway
KN nodes
DF_DA determining step for data segment
DA data segment
DF_DS determining step for data set
DS data set
CPL? query: steps complete?
ID_HR identifying step for host computer
ID_PK identifying step for program complex
ID_AP identifying step for application program
ID_TP identifying step for subprogram
DA>GID assigning step for global ID code
HR,PK,AP,TP>ID assigning step for host/complex/program/subprogram ID code
HID host ID code
KID complex ID code
PID program ID code
TIP subprogram ID code
CLC_HW calculation step for hash value
DA>BF creation step for calculation function
BF calculation function
CLC_KC calculation step for complementary code
CLC_PF calculation step for test function
PF test function
OT_PF output step process equation
TSK task
SLC_DA selection step for data segment
SLC_PF selection step for process function
CLC_RST calculation step result process equation
RST result
RST=GID query step result=global ID code
GID global ID code
RST=query step: all results identical?
CLC_TSK calculation step for task
TRS transfer step for data
RST=RST query step result transmission partner identical
STR_AP restart application program
STR_HR restart host computer

The invention claimed is:

1. A method for creating a computer-assisted test algorithm for processing applications in a computing environment having at least one host computer for executing a number of application programs installed on the at least one host computer and taking into account configuration data for the application programs, wherein for each of the application programs, data describing a respective application program is combined as at least one data segment and the configuration data referring to the respective application program is combined as at least one data segment in each case, data segments of the number of the application programs and of the configuration data are combined in a data set, during a creation of the computer-assisted test algorithm the method comprises the following steps of:
  identifying the data set and assigning a global ID code to the data set;
  identifying components of the computing environment participating in an execution of the application programs of the data set, which comprises the substeps of:
    assigning one host ID code in each case to the at least one host computer identified as one of the components or reading out a plurality of host computers identified as the components or reading out an assigned host ID code; and
    assigning a program ID code to the application programs identified as the components or reading out an assigned program ID code;
  applying a hash function to each of the data segments contained in the data set and one hash value in each case is generated;
  creating a calculation function, which is applied to each of the data segments, wherein:
    host ID codes of participating ones of the host computers, the program ID codes of participating ones of the application programs, the hash value of the data segment and the global ID code are linked together by computational operators; and
    as a result of the calculation function, a complementary code is calculated and stored; and
  creating a test function, which can be applied to each of the data segments, wherein:
    the host ID code of participating ones of the host computers, the program ID of participating ones of the application programs, the hash value of the data segment and the complementary code calculated for the data segment are linked together by computational operators; and
    wherein as a result, the global ID code can be calculated;
  wherein from a first of the application programs, data is transferred to a second of the application programs, wherein the data is transferred together with a result of an associated said test function, and wherein the data from the second of the application programs are only processed if a result of the test function of the first of the application programs transferred with the data matches a result of the test function of the second of the application programs; and
  wherein the first and the second of the application programs are stopped or the at least one host computer identified for the application programs is shut down if a result of the test function of the first of the application programs transferred with the data does not match a result of the test function of the second of the application programs.

2. The method according to claim 1, wherein at least one of the application programs has a plurality of subprograms, wherein:
  for each of the subprograms, data describing a subprogram of the subprograms is combined as the at least one data segment in each case;
  the configuration data referring to a respective subprogram of the subprograms is combined as the at least one data segment in each case;
  a subprogram ID code is assigned to each of the subprograms identified as a component or the subprogram ID code is read out; and
  during a creation of the calculation function and the test function, the subprogram ID codes of participating ones of the subprograms is additionally linked by a computational operator.

3. The method according to claim 2, which further comprises using universally unique identifiers (UUIDs) as the host ID code and/or the program ID code and/or the subprogram ID code and/or system ID codes.

4. The method according to claim 1, which further comprises combining a plurality of the application programs to form a program complex, wherein:
  for each said program complex, data describing the program complex is combined as at least one data segment in each case;
  the configuration data referring to the program complex is combined as at least one data segment in each case;
  a complex ID code is assigned to the program complex identified as a component or the complex ID code is read out; and
  during creation of the calculation function and the test function, complex ID codes of participating program complexes are additionally linked by a computational operator.

5. The method according to claim 1, which further comprises using an message digest 5 (MD5) algorithm as the hash function.

6. The method according to claim 1, wherein ID codes assigned to the components and generated hash values have a same bit length, wherein:
  the test function is established for each bit of the ID codes and the hash value;
  one complementary bit in each case is calculated; and
  the complementary code with a same bit length is calculated from an entirety of complementary bits and stored.

7. The method according to claim 6, which further comprises linking the ID codes, the hash value and the complementary code together by an XOR operator.

8. A method for computer-assisted processing of applications in a computing environment having at least one host computer, which comprises the steps of:
  executing a number of application programs installed on the at least one host computer;
  taking into account configuration data for the application programs;
  combining, for each of the application programs, data describing a respective application program and the configuration data referring to the respective application program in each case as at least one data segment;
  combining data segments of a number of the application programs and the configuration data in a data set; and
  using the computer assisted test algorithm created according to claim 1 to:
    calculate a result of the test function for the data segment; and
    output a result or compare it with the global ID code and output a comparison result;
  wherein from a first of the application programs, data is transferred to a second of the application programs, wherein the data is transferred together with a result of an associated said test function, and wherein the data from the second of the application programs are only processed if a result of the test function of the first of the application programs transferred with the data matches a result of the test function of the second of the application programs; and wherein the first and the second of the application programs are stopped or the at least one host computer identified for the application programs is shut down if a result of the test function of the first of the application programs transferred with the data does not match a result of the test function of the second of the application programs.

9. The method according to claim 8, wherein at least one of the application programs has a number of subprograms, wherein:
for each of the subprograms, data describing a subprogram of the subprograms is combined as at least one data segment in each case;
the configuration data referring to a respective subprogram is combined as at least one data segment;
a subprogram ID code is assigned to the subprogram identified as a component or an assigned subprogram ID code is read out; and
during a calculation of the test function, the subprogram ID codes of participating one of the subprograms are additionally linked by a computational operator.

10. The method according to claim 9, which further comprises combining a plurality of the application programs combined to form a program complex, wherein:
for each said program complex, data describing the program complex is combined as at least one data segment in each case;
configuration data referring to the program complex is combined as at least one data segment; and
during a calculation of the test function, complex ID codes of participating program complexes are linked by a computational operator.

11. The method according to claim 10, wherein before starting a processing procedure, which includes an interaction between a number of the application programs and/or the subprograms and/or the program complexes, results of the test functions of the number of application programs and/or the subprograms and/or the program complexes are compared with each other and a transmission of data between the application programs and/or the subprograms and/or the program complexes is only permitted if all results of the test function match.

12. The method according to claim 11, wherein when not all results of the test function match, the at least one application program and/or the at least one subprogram and/or the at least one program complex, whose result of the test function deviates from a majority of the results of the test function, or the host computer identified for this at least one application program and/or at least one subprogram and/or at least this one program complex is hindered in an execution of this at least one application program and/or at least one subprogram and/or at least one program complex.

13. The method according to claim 10, wherein from a first of the program complexes, data is transferred to a second of the program complexes, wherein the data is transferred together with a result of an associated said test function, and wherein the data from the second of the program complexes are only processed if a result of the test function of the first of the program complexes transferred with the data matches a result of the test function of the second of the program complexes; and
wherein the first and the second of the program complexes are stopped or the at least one host computer identified for the program complexes is shut down if a result of the test function of the first of the program complexes transferred with the data does not match a result of the test function of the second of the program complexes.

14. The method according to claim 9, wherein from a first of the subprograms, data is transferred to a second of the subprograms, wherein the data is transferred together with a result of an associated said test function, and wherein the data from the second of the subprograms are only processed if a result of the test function of the first of the subprograms transferred with the data matches a result of the test function of the second of the subprograms; and
wherein the first and the second of the subprograms are stopped or the at least one host computer identified for the subprograms is shut down if a result of the test function of the first of the subprograms transferred with the data does not match a result of the test function of the second of the subprograms.

15. The method according to claim 8, wherein the ID codes assigned to the components and the values have a same bit length, wherein:
the test function is established for each bit of the ID codes and the hash value and the complementary codes;
one result bit in each case is calculated; and
the result test function with a same bit length is calculated from an entirety of the result bit and stored.

16. A safety-relevant computing environment having at least one host computer, wherein the at least one host computer is adapted to carry out the method according to claim 1.

17. A non-transitory computer readable medium storing a computer program product having computer executable commands for carrying out the method according to claim 8.

18. A non-transitory computer readable medium storing a computer program product having computer executable commands for carrying out the method according to claim 1.

* * * * *